(12) United States Patent
Davis et al.

(10) Patent No.: US 11,002,225 B1
(45) Date of Patent: May 11, 2021

(54) AIR-BREATHING ROCKET ENGINE

(71) Applicant: Mountain Aerospace Research Solutions, Inc., Whitefish, MT (US)

(72) Inventors: Aaron Davis, Whitefish, MT (US); Scott Stegman, Santa Barbara, CA (US)

(73) Assignee: Mountain Aerospace Research Solutions, Inc., Whitefish, MT (US)

( * ) Notice: Subject to any disclaimer, the term of this patent is extended or adjusted under 35 U.S.C. 154(b) by 0 days.

(21) Appl. No.: 16/828,285

(22) Filed: Mar. 24, 2020

Related U.S. Application Data

(63) Continuation-in-part of application No. 16/776,325, filed on Jan. 29, 2020.

(51) Int. Cl.
| | |
|---|---|
| *F02K 9/62* | (2006.01) |
| *F02K 9/52* | (2006.01) |
| *F02K 9/78* | (2006.01) |
| *F02K 7/18* | (2006.01) |

(52) U.S. Cl.
CPC ............... *F02K 9/62* (2013.01); *F02K 7/18* (2013.01); *F02K 9/52* (2013.01); *F02K 9/78* (2013.01)

(58) Field of Classification Search
CPC ............... F02K 7/18; F02K 9/42; F02K 9/78
See application file for complete search history.

(56) References Cited

U.S. PATENT DOCUMENTS

| | | | | |
|---|---|---|---|---|
| 2,735,263 | A | * | 2/1956 | Charshafian .............. F02K 7/18 60/260 |
| 3,200,589 | A | | 8/1965 | Mower et al. |
| 4,428,191 | A | | 1/1984 | Lane et al. |

(Continued)

FOREIGN PATENT DOCUMENTS

| | | |
|---|---|---|
| CA | 2677423 A1 | 8/2008 |
| EP | 1515035 A2 | 3/2005 |

(Continued)

OTHER PUBLICATIONS

Berkeley, Duncan, Ejectors, Dec. 1958, Petroleum Refiner (Year: 1958).*

(Continued)

*Primary Examiner* — Todd E Manahan
*Assistant Examiner* — Kyle Robert Thomas
(74) *Attorney, Agent, or Firm* — Perkins Coie LLP; Jordan Becker

(57) ABSTRACT

An air-breathing rocket engine in certain embodiments comprises an hourglass-shaped outer shell and an interior portion situated entirely within the front end of the outer shell. The interior portion includes a funnel-shaped intake that terminates in a floor and an inner front wall that forms a first circumferential gap between the inner front wall and the outer surface of the funnel-shaped intake. The intake has a central aperture that is in fluid communication with the throat and exhaust areas within the outer shell. A second circumferential gap is formed between the outer surface of the front inner wall and the inner surface of the front end of the outer shell and is in fluid communication with the throat and exhaust areas within the outer shell. One or more injector polis and one or more ignition ports are situated at the front end of the second circumferential gap.

16 Claims, 6 Drawing Sheets

(56) References Cited

U.S. PATENT DOCUMENTS

| | | | |
|---|---|---|---|
| D273,579 S | 4/1984 | Martin et al. | |
| 4,471,609 A | 9/1984 | Porter et al. | |
| 5,127,602 A | 7/1992 | Batey et al. | |
| 5,224,344 A * | 7/1993 | Keirsey | F02K 7/18 60/244 |
| 5,282,359 A | 2/1994 | Chester | |
| 5,727,378 A | 3/1998 | Seymour | |
| 2005/0060982 A1 | 3/2005 | Mani et al. | |
| 2007/0245741 A1 | 10/2007 | Johnson et al. | |
| 2010/0008772 A1 | 1/2010 | Vauchel et al. | |
| 2010/0205933 A1 | 8/2010 | Mungas et al. | |
| 2013/0014515 A1 | 1/2013 | Bellabal et al. | |
| 2014/0161618 A1 | 6/2014 | Walker et al. | |
| 2014/0352797 A1 | 12/2014 | Aten et al. | |
| 2015/0377033 A1 | 12/2015 | Xu | |
| 2016/0040552 A1 | 2/2016 | Rahaim et al. | |
| 2016/0169516 A1 | 6/2016 | Low et al. | |
| 2016/0186689 A1 | 6/2016 | Bartel et al. | |
| 2017/0159490 A1 | 6/2017 | Sennoun | |
| 2018/0038278 A1 | 2/2018 | Taliercio et al. | |
| 2018/0073391 A1 | 3/2018 | Jennings | |
| 2018/0280851 A1 | 10/2018 | Klaus et al. | |
| 2020/0052570 A1 | 2/2020 | Holcomb | |

FOREIGN PATENT DOCUMENTS

| | | |
|---|---|---|
| JP | 2013019330 A | 1/2013 |
| WO | 2014196634 A1 | 12/2014 |
| WO | 2018115731 A1 | 6/2018 |

OTHER PUBLICATIONS

Salmi, Bryce, The World's Largest 3D Metal Printer Is Churning Out Rockets, Oct. 25, 2019, IEEE Spectrum (Year: 2019).*
U.S. Appl. No. 16/776,325, filed Jan. 29, 2020.
U.S. Appl. No. 17/094,733, filed Nov. 10, 2020.
Written Opinion and International Search Report dated Mar. 4, 2021 cited in PCT/US2021/015091.
Notice of Allowance issued in U.S. Appl. No. 16/776,325 dated Feb. 10, 2021.
Corrected Notice of Allowability issued in U.S. Appl. No. 16/776,325 dated Feb. 24, 2021.

* cited by examiner

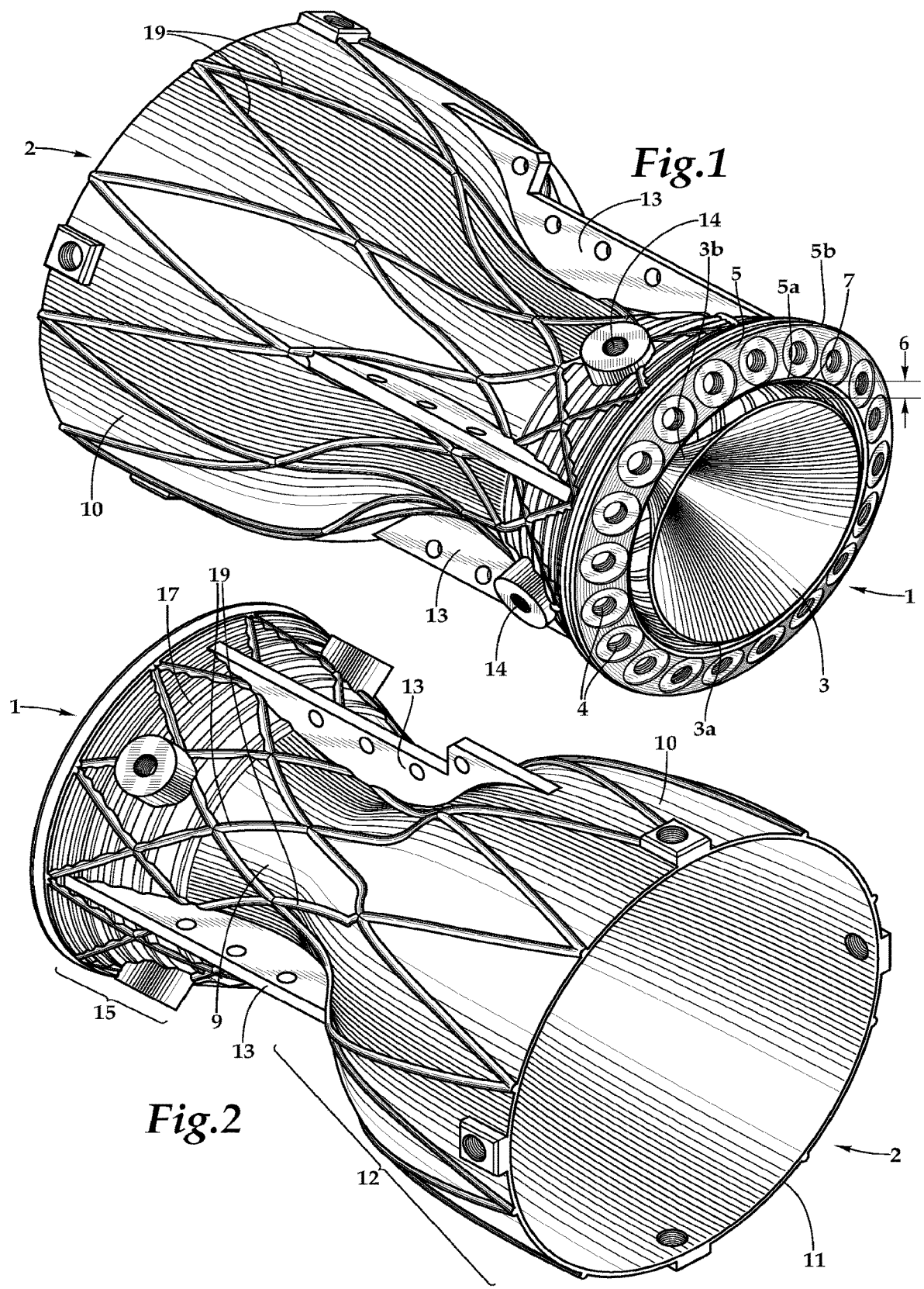

AIR-BREATHING ROCKET ENGINE

This application is a continuation-in-part of U.S. patent application Ser. No. 16/776,325, filed on Jan. 29, 2020, now U.S. Pat. No. 10,961,952, which is incorporated by reference herein in its entirety.

FIELD OF THE INVENTION

The present invention relates generally to the field of propulsion engines, and more particularly, to a rocket engine with no moving parts that intakes ambient fluid for use as free reaction mass and is capable of using oxidizer contained within the fluid for the combustion cycle.

BACKGROUND

There are two major differences between rocket engines and jet engines. The first is that rocket engines must carry not only all of their own fuel into space but also a source of oxygen to burn that fuel. Jet engines, on the other hand, carry fuel, but they use oxygen from the air to burn that fuel. The second major difference is that jet engines have an air intake and an exhaust opening, whereas rocket engines typically receive fuel and oxidizer via a closed manifold system and have only an exhaust opening. Both types of engines produce thrust through an internal pressure difference, and both eject exhaust gases in a direction that is opposite to that of the path of travel of the engine.

Current jet engine designs, including marine and aerospace jet engines, rely on moving parts such as impellers or compressors in order to function. These moving parts increase manufacturing and maintenance costs and present performance risk. For example, a fault in the turbine or compressor blades in an aerospace engine can result in catastrophic failure of the entire engine and loss of life. Some known examples of engine designs are set forth below.

U.S. Pat. No. 4,428,191 ("Lane") titled "Fuel Combustion in Ducted Flow" provides a combustion apparatus with a duct for containing a flow of air and an air-fuel mixing device having an assembly of transversely spaced longeron members extending along the duct. The longeron members are inclined to the general direction of flow through the duct and to the walls of the duct so that a major portion of the flow through the duct will pass through the spaces between the longeron members. The longitudinal edges of the longeron members are adapted to shed continuous vortices. A baffle extends across the upstream end of the longeron members and forms a sheltered pilot combustion zone. The engine in Lane further comprises means for generating pilot vortices of combustible mixture in the pilot zone, causing each pilot vortex to divide, and directing the divided portion of each pilot vortex to pass downstream along adjacent parts of adjacent longeron members.

U.S. Pat. No. 5,282,359 ("Chester") titled "Impulse Jet Engine" describes a jet engine with no moving parts and a toroidal combustion chamber. A toroidal exhaust port directs exhaust gases radially inward and toward the engine outlet. The exhaust gases induce a secondary air flow through the engine, and the entrained secondary air enters the engine inlet, thereby cooling and slowing the exhaust gases. In an alternate embodiment, the trailing end of the housing is frustoconical, and the exhaust port directs the exhaust gases to converge toward one another, thereby causing the entrained air to flow in a converging pattern. In both embodiments, the mass of the entrained, secondary air is large relative to the mass of the exhaust gases so that the secondary air flows through the engine at a relatively low velocity.

U.S. Pat. No. 5,727,378 ("Seymour") titled "Gas Turbine Engine" discloses a small, "air-breathing" gas turbine engine. The engine comprises a flame-free primary mixing zone in the combustion chamber, a primary combustion zone, a secondary combustion zone, and a dilution zone. A bearing assembly is located between a compressor and a turbine wheel. A cooling cavity is sihlated between the turbine wheel and the bearing assembly. The engine in Seymour also comprises a toroidally-shaped compressor discharge plenum, which is between the compressor and the turbine wheel. The toroidally-shaped compressor discharge plenum acts as an air accumulator, an air shock absorber, and an air stabilizer.

U.S. Patent Application Pub. No. 2018/0038278 ("Taliercio") titled "Constant-Volume Combustion System for a Turbine Engine of an Aircraft Engine" provides a combustion system for a turbine engine in which a plurality of combustion chambers is regularly distributed around a longitudinal axis. A toroidal manifold includes a radially oriented outlet for supplying compressor air to each combustion chamber. A toroidal exhaust pipe with a radially oriented inlet collects the combustion gases from the combustion chambers, which are radially positioned between the manifold outlet and the exhaust pipe inlet. The drawing in of the compressed air from the manifold outlet and the ejection of combustion gas toward the exhaust pipe are controlled by a timing device for each chamber.

SUMMARY

Introduced here is an engine that, in at least one embodiment, comprises a shell, an intake, a primary combustion chamber and a secondary combustion chamber. The intake is situated within the shell and is a channel via which to draw ambient fluid (such as, but not limited to, air) into the engine. The primary combustion chamber is situated within the shell and is used to combust a mixture of fuel and oxidizer. The secondary combustion chamber is situated within the shell and is in fluid communication with the intake. The secondary combustion chamber is used to combust a mixture of ambient fluid received via the intake and uncombusted mass expelled from the primary combustion chamber. The intake, the primary combustion chamber, and the secondary combustion chamber are collectively arranged so that, when the engine is in operation, ejection of mass from the primary combustion chamber into the secondary combustion chamber causes a pressure differential that causes ambient fluid to be drawn into the secondary combustion chamber via the intake.

In at least some embodiments, the shell, the intake, the primary combustion chamber and the secondary combustion chamber are all formed from a single piece of material. In at least some embodiments, when the engine is in operation, ambient fluid drawn into the secondary combustion chamber via the intake is used as reaction mass in the secondary combustion chamber; and, if the ambient fluid contains oxidizer, the oxidizer in the ambient fluid is used for combustion in the secondary combustion chamber.

In at least some embodiments, the primary combustion chamber is annular in shape and is disposed about a longitudinal axis of the engine. In at least some embodiments, the intake and the primary combustion chamber are situated within a front end of the engine relative to an intended direction of travel of the engine during operation of the engine on a vehicle. In at least some embodiments, the primary combustion chamber comprises an annular (e.g., toroidal) gap defined about the longitudinal central axis between an inner surface of a front end of the shell and an outer surface of the intake.

In at least some embodiments, the secondary combustion chamber comprises a throat area defined by a portion of an interior surface of the shell. In at least some embodiments, the intake is substantially conical in shape, and a front opening of the intake, relative to an intended direction of travel of the engine during operation of the engine on a vehicle, is wider than a rear opening of the intake.

In at least some embodiments, the engine further comprises an oxidizer port and a fuel port, each in fluid communication with the primary combustion chamber, via which to introduce oxidizer and fuel, respectively, into the primary combustion chamber. In at least some embodiments, the engine comprises a plurality of oxidizer ports and a plurality of fuel ports, each in fluid communication with the primary combustion chamber, via which to introduce oxidizer and fuel, respectively, into the primary combustion chamber, wherein the plurality of oxidizer ports and the plurality of fuel ports are disposed circumferentially about the longitudinal central axis.

The techniques introduced here further include a method of generating thrust. In at least some embodiments, the method comprises receiving fuel and oxidizer into an engine; and generating thrust by expelling reaction mass from the engine, by combusting the fuel and oxidizer received into the engine to create a pressure differential that causes ambient fluid to be drawn into the engine, and using the ambient fluid drawn into the engine by said pressure differential as at least one of: a) oxidizer for additional combustion, or b) reaction mass.

In at least one embodiment, the engine comprises: an outer shell, the outer shell being hourglass-shaped and having a front end, a throat area, and an exhaust, the throat area being situated between the front end and the exhaust, the throat area have a smaller inner diameter than the front end or the exhaust; a funnel-shaped intake situated at least partially inside of the front end of the outer shell and terminating in a floor; a circumferential front ledge forming a perimeter of the front end of the outer shell, the circumferential front ledge comprising one or more injector ports; and at least one ignition port situated on an outside of the outer shell on the front end of the outer shell between the circumferential front ledge and the throat area; wherein the circumferential front ledge comprises an inner edge and an outer edge; wherein an inner front wall extends from the inner edge of the circumferential front ledge to the floor; wherein the intake comprises an outer wall that forms a skirt over the floor; wherein the outer wall of the intake, the inner front wall, and the skirt are configured to form a first circumferential gap between the intake and the inner front wall, the first circumferential gap not being in fluid communication with the throat or the exhaust; wherein the first circumferential gap has an inner diameter, and the inner diameter of the first circumferential gap widens from a front end of the first circumferential gap to the skirt; wherein the inner front wall comprises an outer surface, wherein the outer shell comprises an inner surface, and wherein the outer surface of the front inner wall and the inner surface of the front end of the outer shell are configured to form a second circumferential gap, the second circumferential gap being in fluid communication with the at least one injector port and the at least one ignition port; wherein the second circumferential gap has an inner diameter, and the inner diameter of the second circumferential gap decreases at a terminal end of the second circumferential gap, the terminal end of the second circumferential gap being aligned laterally with the floor; wherein the second circumferential gap is in fluid communication with the throat and exhaust; wherein the intake has an inner diameter that decreases from a front edge of the intake to a point forward of the floor and increases from said point to the floor; wherein the intake comprises a central aperture that extends from the front edge of the intake to the floor and is in fluid communication with the throat area and exhaust; wherein the throat area comprises a front end, and the terminal end of the second circumferential gap is situated at the front end of the throat area; wherein the throat area is in fluid communication with the exhaust; and wherein the central aperture of the intake terminates at the front end of the throat area.

In at least one embodiment, the outer shell comprises an outer surface, and the outer surface of the outer shell comprises a plurality of crisscrossed ridges. In at least one other embodiment, the inner front wall comprises an inner surface, and the inner surface of the inner front wall comprises a plurality of circumferential ridges. In one embodiment, a front end of the first circumferential gap is open to the atmosphere.

In at least one embodiment, the outer edge of the circumferential front ledge has a diameter, the outer shell comprises a rear edge, the rear edge is circular in shape, the rear edge has an outer diameter, and the outer diameter of the rear edge of the outer shell is greater than the diameter of the outer edge of the front circumferential ledge. In at least one other embodiment, the floor has a perimeter, and the perimeter of the floor or bulbous in shape with a rounded circumferential outer edge. In yet another embodiment, the floor is angled upward toward the central aperture of the intake.

In at least one embodiment, the floor has a width, the central aperture has a width, and the front edge of the intake has a width; and the width of the floor is greater than the width of the central aperture but less than the width of the front edge of the intake. In at least one other embodiment, the throat area comprises a center part with an inner diameter, the rear edge of the outer shell has an inner diameter, and the inner diameter of the center part of the throat area is approximately 0.5 times the inner diameter of the rear edge of the outer shell. In yet another embodiment, the inner diameter of the second circumferential gap is constant except at the terminal end, and the inner diameter of the second circumferential gap at the terminal end is approximately 0.38 times the inner diameter of the second circumferential gap other than at the terminal end.

BRIEF DESCRIPTION OF THE DRAWINGS

One or more embodiments of the present disclosure are illustrated by way of example and not limitation in the figures of the accompanying drawings, in which like references indicate similar elements.

FIG. 1 is a front perspective view of the engine introduced here.

FIG. 2 is a rear perspective view of the engine.

REFERENCE NUMERALS

Figure 3:
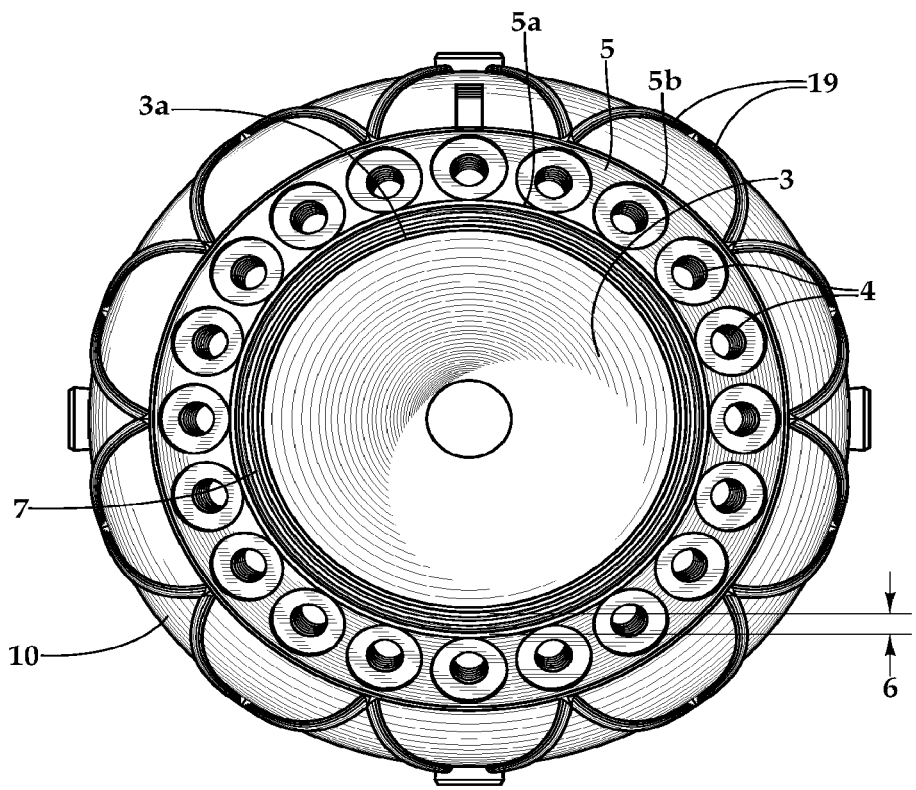
FIG. 3 is a front view of the engine.

The following reference numerals are used in the disclosure below:
1 Front end of the engine
2 Rear end of the engine
3 Funnel-shaped intake
3a Front edge of intake
3b Outer wall of intake
4 Fuel/oxidizer injector port
5 Circumferential front ledge
5a Inner edge of circumferential front ledge
5b Outer edge of circumferential front ledge
6 First circumferential gap
7 Inner front wall
7a Center of inner front wall
8 Floor
8a Rounded outer edge of floor
8b Skirt
9 Throat area
10 Outer shell
11 Rear edge of the engine
12 Exhaust
13 Mounting bracket
14 Ignition port
15 Front end of outer shell
16 Second circumferential gap
17 Circumferential ridges on front end of outer shell
18 Circumferential ridges on inside surface of inner front wall
19 External ridges
20 Central aperture of intake
21 Interior portion of the engine

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is an engine that is neither a conventional rocket engine nor a conventional jet engine, because the vehicle on which it is mounted carries both fuel and oxidizer but requires less oxidizer than would be required for a conventional rocket engine. The engine can be formed from a single piece of material and therefore requires no maintenance beyond verifying structural integrity of the engine body and fuel systems. Note that wherever references are made herein to "ambient air," other fluids may be substituted for the ambient air. The term "ambient fluid" includes, but is not limited to, ambient air.

FIG. 1 is a front perspective view of an engine in accordance with at least some embodiments introduced herein. As shown in all of the figures, the engine can be a single piece of material with no moving parts. This characteristic, in and of itself, distinguishes the engine from other engines used in aviation or space applications. In at least one embodiment, the material is an INCONEL® nickel-chromium alloy or any other refractory superalloy. Referring to FIGS. 1 and 2, the engine comprises a front end 1 and a rear end 2. The front end 1 is the end that is frontward relative to the intended direction of travel of a vehicle on which the engine is mounted. The rear end 2 is the end that is aftward relative to the intended direction of travel of a vehicle on which the engine is mounted. The front end 1 of the engine comprises a funnel-shaped intake 3 and a plurality of fuel and oxidizer injector ports 4. The funnel-shaped intake faces forward so that the widest part of the intake forms a mouth at the front end 1 of the engine.

The plurality of fuel and oxidizer injector ports 4 are disposed radially around a perimeter of the front end of the engine and surround the front edge 3a of the intake 3 (with a gap 6 between the circumferential front ledge 5 and the front edge 3a of the intake 3). The plurality of fuel and oxidizer injector ports 4 are situated on a circumferential front ledge 5 that forms the perimeter of the front end 1 of the engine. The circumferential front ledge 5 is preferably angled downward so that the inner edge 5a of the circumferential front ledge 5 is slightly closer to the front end 1 of the engine than the outer edge 5b of the circumferential front ledge 5. Thus, the fuel and oxidizer injector ports are at about a forty-five-degree (45°) angle relative to a longitudinal central axis of the engine or about a one hundred thirty-five-degree (135°) angle relative to a lateral axis of the engine (see FIG. 5). The front edge 3a of the intake 3 preferably extends forwardly of the inner edge 5a of the circumferential front ledge 5 so that the front edge 3a of the intake 3 is the forward-most part of the engine (see FIG. 5). The front edge 3a of the intake 3, the inner edge 5a of the circumferential front ledge 5, and the outer edge of the circumferential front ledge 5 are all preferably circular in shape.

As noted above, there is a first circumferential gap 6 between the front edge 3a of the intake 3 and the inner edge 5a of the circumferential front ledge 5. This first circumferential gap 6 lies between the outer wall 3b of the intake 3 and an inside surface of an inner front wall 7 that is situated directly underneath (rearward) of the inner edge 5a of the circumferential front ledge 5 and within the outer shell 10. In one embodiment (not shown), the front end of the first circumferential gap 6 is sealed and circulates fuel before it is combusted in order to provide conductive cooling to the combustion chamber and pre-heat fuel. In another embodiment, the front end of the first circumferential gap 6 is open to the ambient air to provide cooling.

Figure 6:
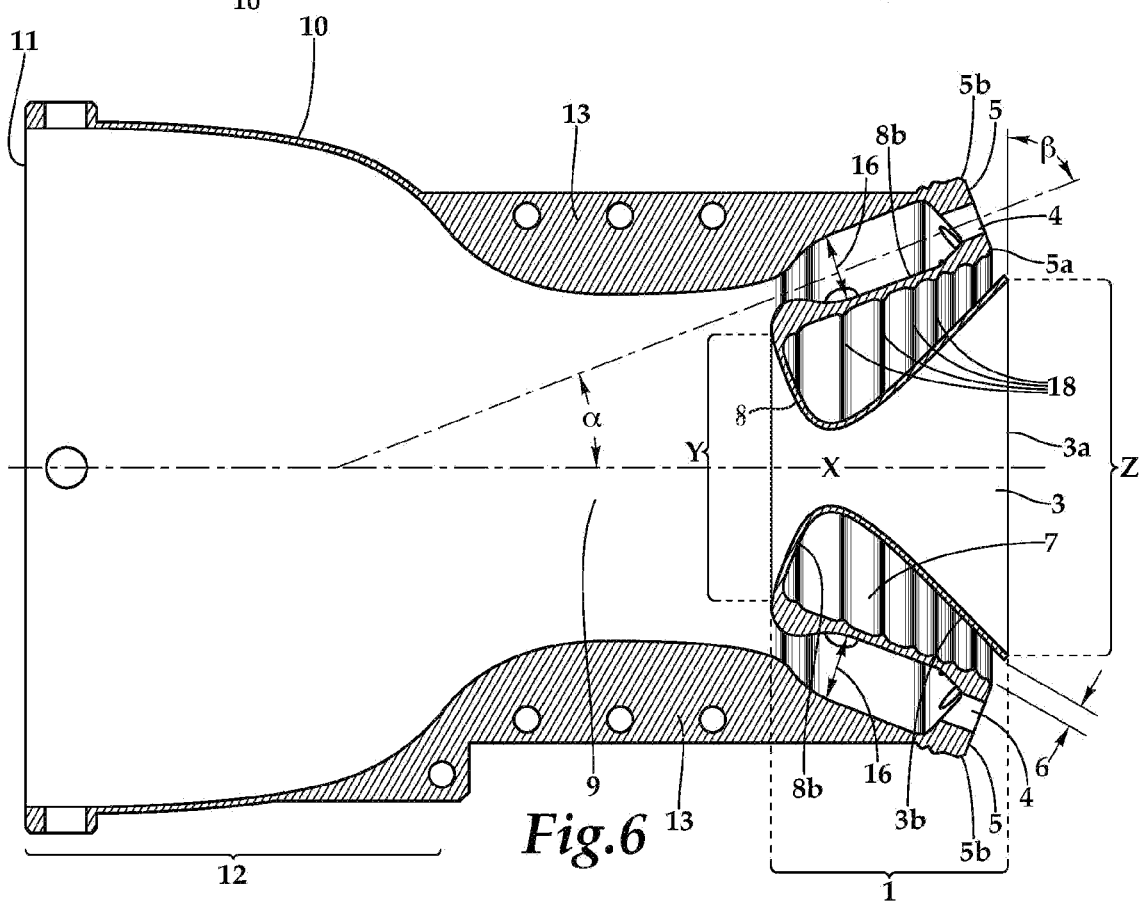
FIG. 6 is a cross-sectional view of the engine corresponding to the side view in FIG. 5.

The outer wall 3b of the intake 3 and the inner front wall 7 are spaced apart from one another for a certain distance and joined together at a skirt 8b (see FIG. 6). The inner front wall 7 is tapered inward (toward the center of the engine) at a relatively constant angle equal to approximately forty-five degrees (45°) relative to the longitudinal central axis of the engine, whereas the funnel-shaped intake 3 tapers inward much more drastically than the inner front wall 7; therefore, the distance between the outer wall 3b of the intake 3 and the inner front wall 7 (that is, the size of the first circumferential gap 6) increases from the front end of the first circumferential gap 6 to the skirt 8b. The floor 8 is situated inside of the engine (that is, inside of the outer shell 10) just forward of the throat area 9 (see FIG. 6) and within the front end 1 of the engine (see FIG. 6). The floor 8 is inside of the skirt 8b.

The engine further comprises an outer shell 10 that extends from the outer edge 5b of the circumferential front ledge 5 to the rear edge 11 of the engine. The rear edge 11 is circular in shape and larger in diameter than the outer edge 5b of the circumferential front ledge 5. The outer shell 10 is shaped like an hourglass; it tapers inward from the outer edge 5b of the circumferential front ledge 5 to the throat area 9 (or waist) of the engine and then expands outward to the exhaust 12. Mounting brackets 13 preferably span the outer shell 10 (in a longitudinal direction) at the throat area 9 and front end 15, as shown. Two pairs of opposing ignition ports 14 are situated on the front end 15 of the outer shell 10 beneath (or rearward of) the circumferential front ledge 5. The fuel and oxidizer injector ports 4 and the ignition ports 14 are preferably threaded and configured to accept, respectively, fuel and/or oxidizer hoses and spark plugs. In at least one embodiment, there is one ignition port 14 for every five injector ports 4. The thickness of the outer shell 10, outer wall 36 of the intake 3, and inner front wall 7 may be optimized (that is, mass may be added or decreased in certain areas) depending on modular and tensile strength requirements and localized thermal requirements.

Figure 4:
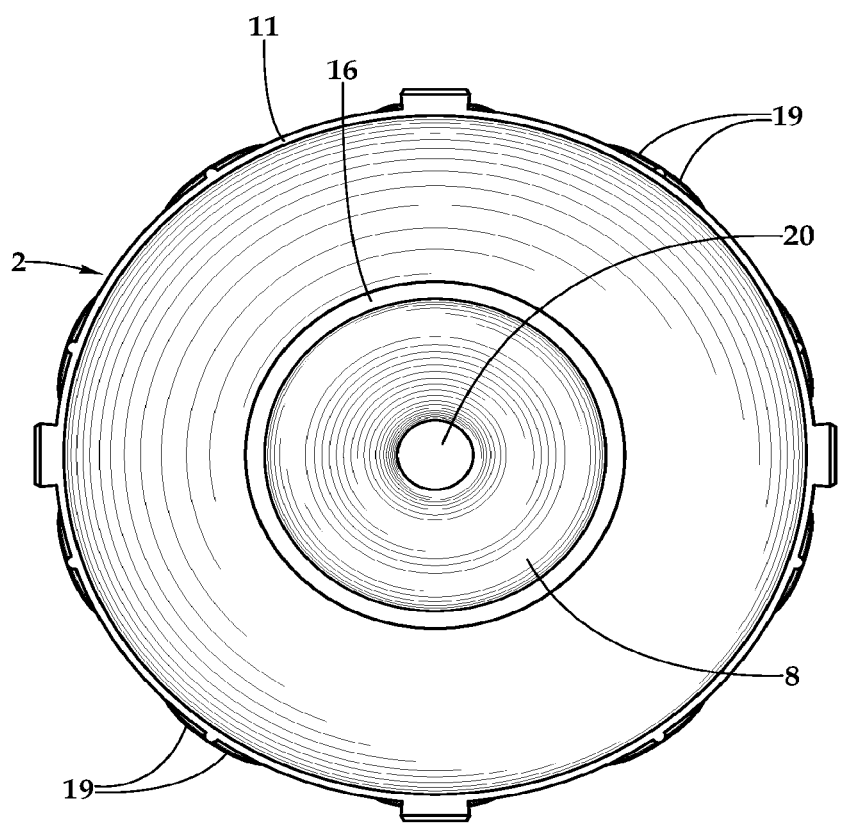
FIG. 4 is a rear view of the engine.

There is a second circumferential gap 16 between the outside surface of the inner front wall 7 and the outer shell 10 (see FIG. 4). This second circumferential gap 16 is in fluid communication with (that is, open to) the throat area 9 and exhaust 12, whereas the first circumferential gap 6 is not. The circumferential front ledge 5 encloses the front end of the second circumferential gap 16, and the fuel and oxidizer injector ports 4 are configured to enable the injection of fuel and/or oxidizer into the second circumferential gap 16. In at least one embodiment, the outside surface of the front end 15 of the outer shell 10 comprises a plurality of circumferential ridges 17 (also referred to as "hat banding" or "strengthening hoops"); these ridges contribute to the structural integrity of the engine. The inside surface of the inner front wall 7 (that is, that side of the inner front wall 7 that faces the funnel-shaped intake 3) preferably also comprises a plurality of circumferential ridges 18 for the same reason.

Figure 5:
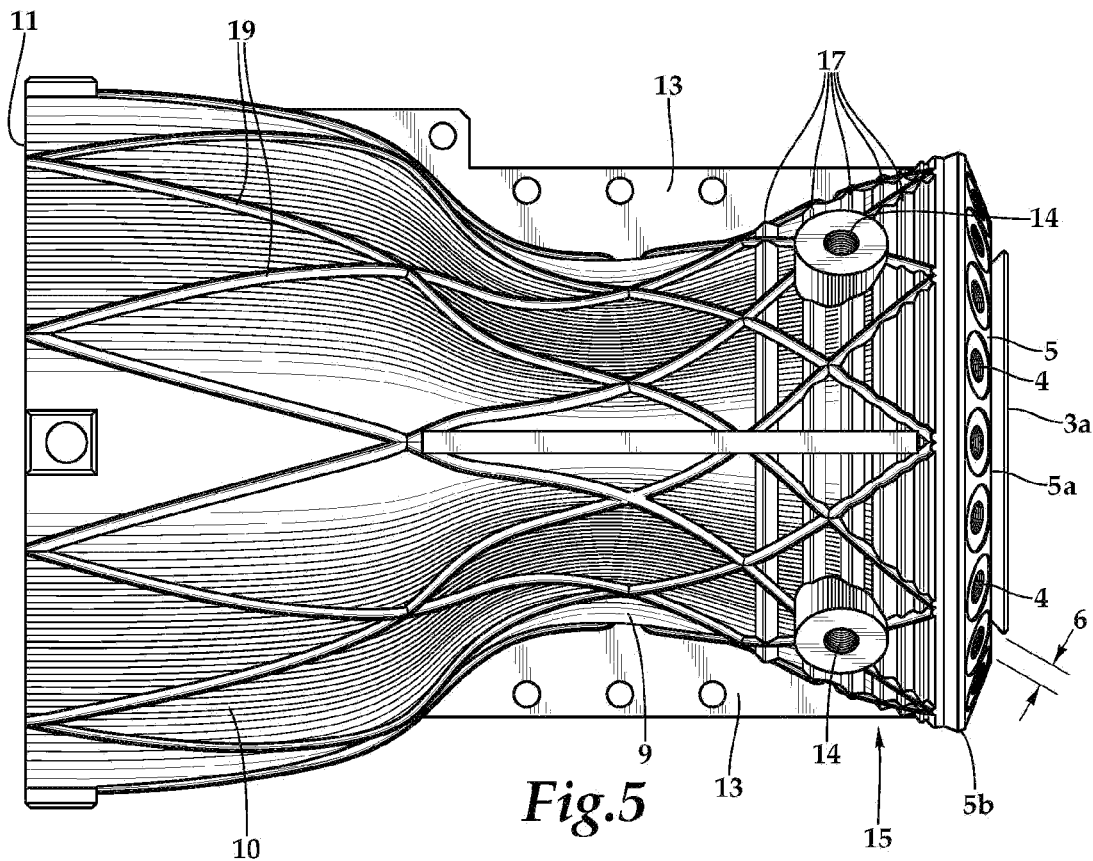
FIG. 5 is a side view of the engine.

FIGS. 3 and 4 are front and rear views, respectively, of the engine. FIG. 5 is a side view of the engine. As shown in the latter figure, as well as FIGS. 1 and 2, the outer shell preferably comprises a crisscrossed pattern of external ridges 19 extending from the outer edge 5b of the circumferential front ledge 5 to the rear edge 11 of the engine. These external ridges 19 impart additional structural integrity to the engine. They preferably overlie the circumferential ridges 17 on the front end 15 of the outer shell 10.

FIG. 6 is a cross-sectional view, corresponding to the side view of FIG. 5, taken at a vertical plane through the longitudinal central axis of the engine. Note that the intake 3 preferably tapers to a point ("X" on FIG. 6) and then expands outward toward the floor 8 (the outward expansion of the outer wall 3b of the intake 3 forms the skirt 8b). In at least one embodiment, the width of the floor ("Y" on FIG. 6) is greater than "X" (which is the width of the central aperture 20) but less than the width of the intake 3 at the front edge 3a (depicted as "Z" on FIG. 6). In at least one embodiment, the floor 8 is not flat but rather angled upwards toward the central aperture 20.

Figure 7:
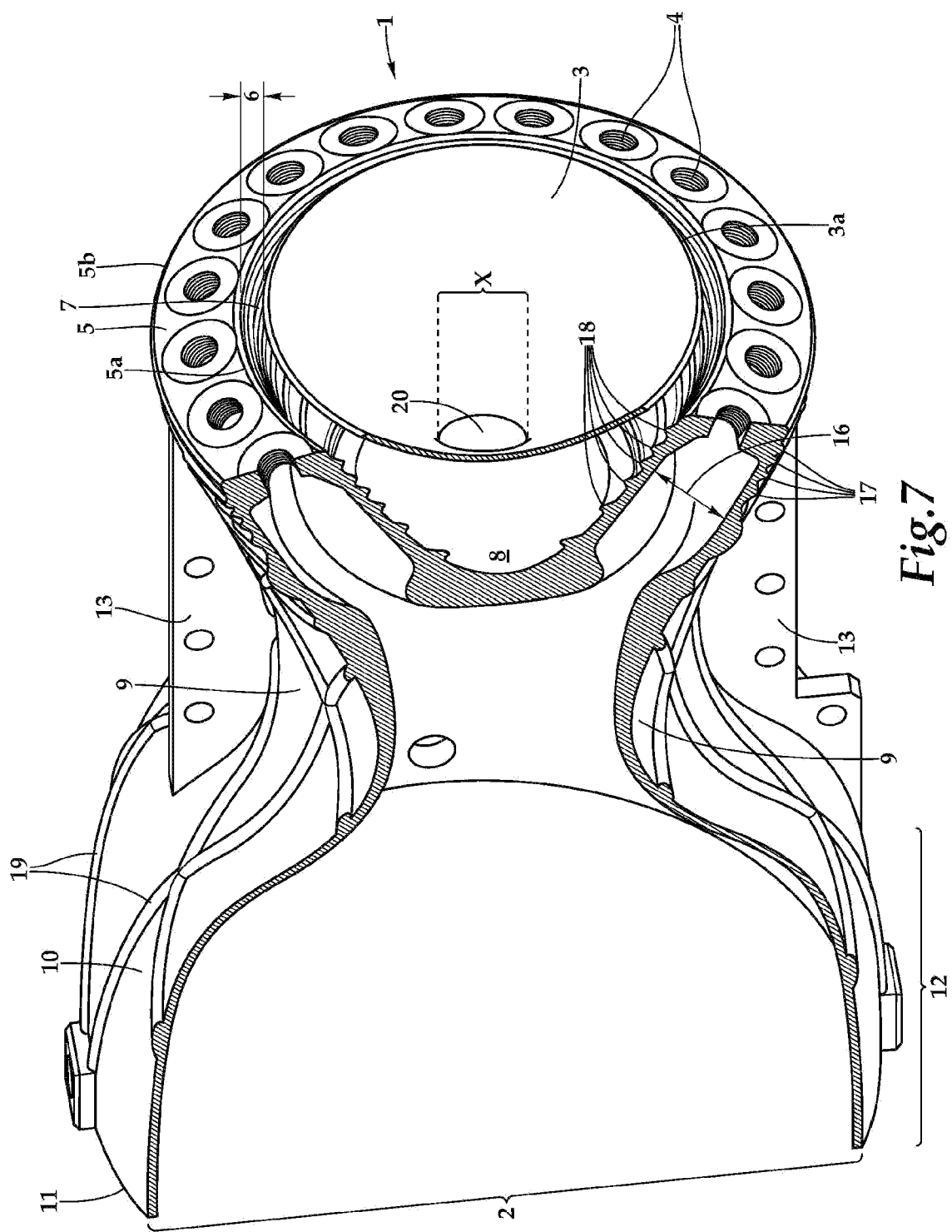
FIG. 7 is a front cutaway perspective view of the engine.

FIG. 7 is a front cutaway perspective view of the engine. This figure shows the tapering of the intake 3 (from front to rear) to point "X" and then the broadening of the intake 3 (again, from front to rear) to form the floor 8. Note that the central aperture 20 of the intake 3 (formed by the taper point "X") is in fluid communication with (that is, open to) the throat 9 and exhaust 12 portions of the engine (see also FIGS. 4 and 6).

Figure 8:
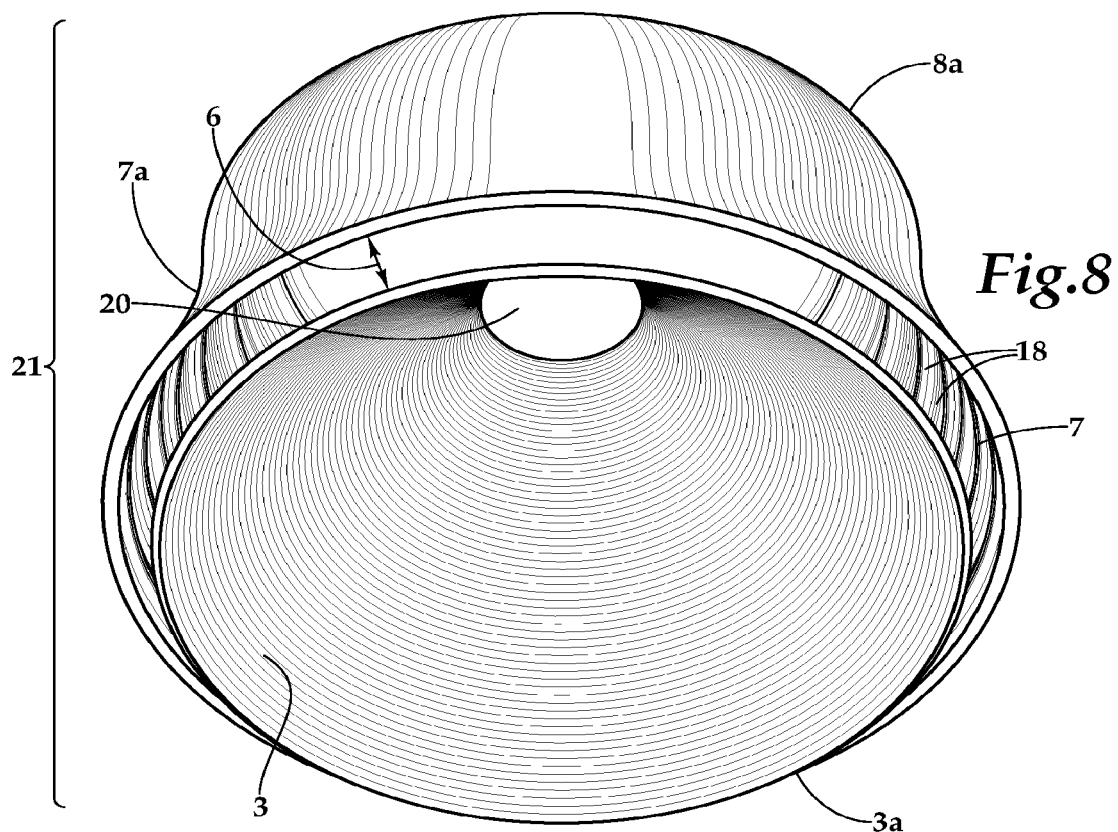
FIG. 8 is a front perspective view of the interior portion of the engine.
Figure 9:
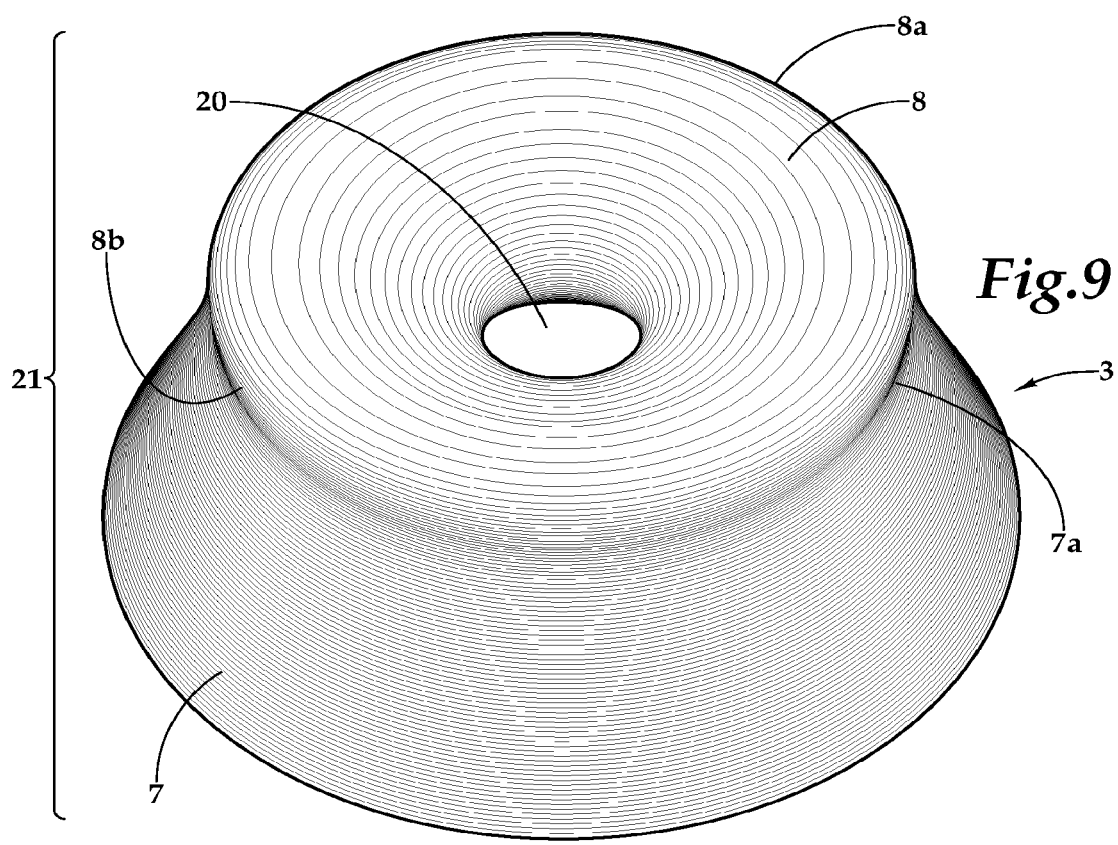
FIG. 9 is a rear perspective view of the interior portion of the engine.

FIG. 8 is a front perspective view of the interior portion of the engine, and FIG. 9 is a rear perspective view of the interior portion of the engine. In these two figures, the outer shell 10 and circumferential ledge 5 (with the fuel and oxidizer ports 4) have been removed to better illustrate the interior portion of the engine. The interior portion 21 of the engine comprises the intake 3, inner front wall 7 and floor 8 (the outer wall 3b of the intake and the inner front wall 7 being joined at the skirt 8b, as explained above). Although the first circumferential gap 6 is shown, the second circumferential gap 16 is not shown because the outer shell 10 has been removed.

Note that the perimeter of the floor 8 is preferably bulbous in shape with a rounded circumferential outer edge 8a. The inner front wall 7 tapers inward at its center 7a (see also FIG. 6). That part of the second circumferential gap 16 that lies between the center 7a of the inner front wall 7 and the outer shell 10 forms an annular (e.g., toroidal) combustion chamber. As noted above, the floor 8 demarcates the rear of the front end 1 and the front of the throat area 9 of the engine (see FIG. 6); thus, the entire interior portion 21 of the engine is situated within the front end 1 of the engine.

Figure 10:
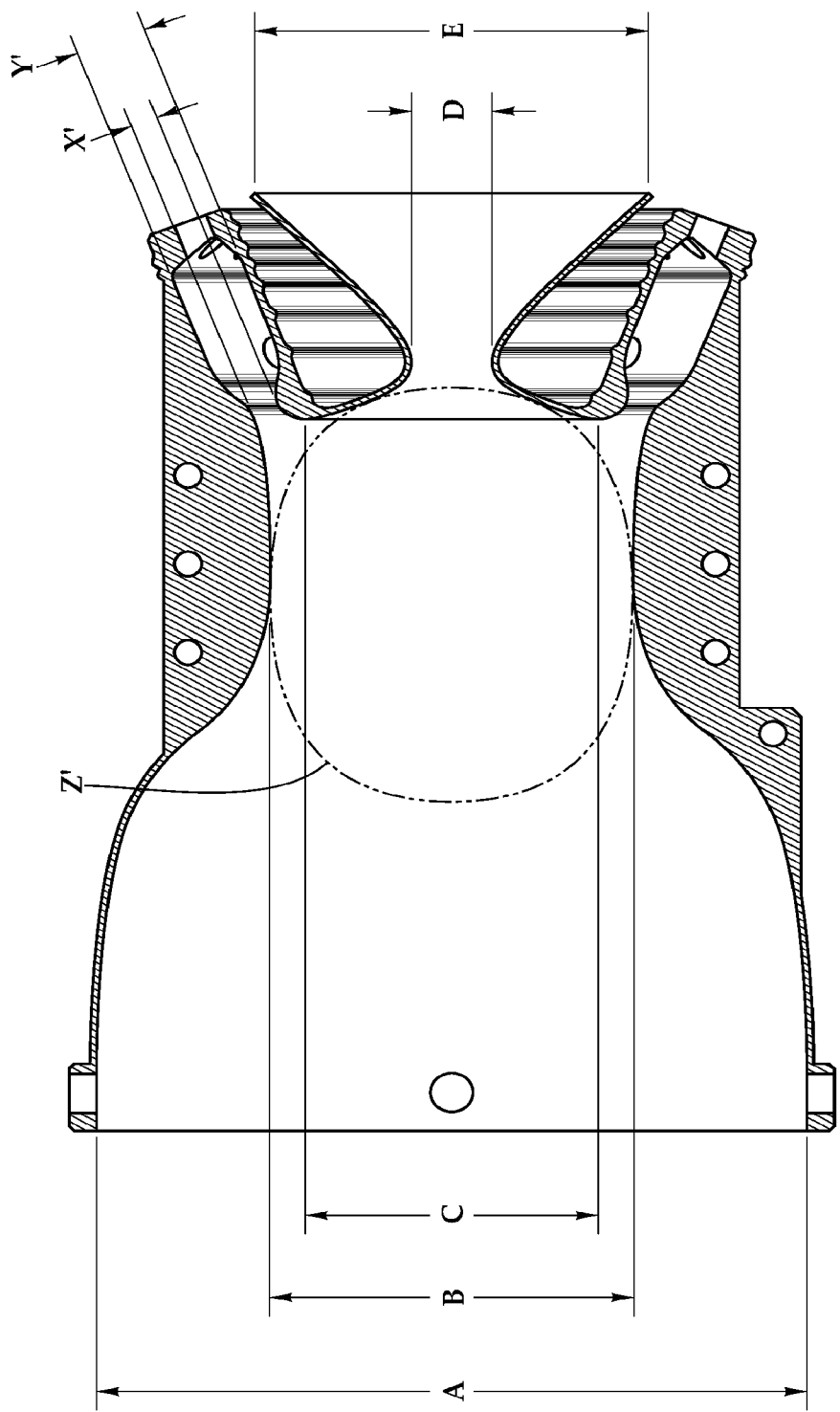
FIG. 10 is a cross-sectional view of the engine corresponding to the side view in FIG. 5 and including dimensional annotations.

FIG. 10 is the same view as shown in FIG. 6, but with added annotations regarding certain dimensional features of the engine. Dimension A is the inside diameter of the exhaust 12 at the rear edge 11. Dimension B is the inner diameter of the engine at the center part of the throat area 9. Dimension C is the distance between the two rear-most points of the floor 8 of the intake 3 (also denoted as Y on FIG. 6). Dimension D is the inner diameter of the intake 3 at the choke point denoted as X on FIG. 6. Dimension E is the inner diameter of the intake 3 at the front edge 3a denoted as Z on FIG. 6. Dimension X' is the inner diameter of the second circumferential gap 16 at the point at which fluid exiting the gap 16 enters the throat area 9. Dimension Y' is the inner diameter of the second circumferential gap 16 at its center (and along most of the length of the gap 16 until it tapers to dimension X').

In at least one embodiment, with reference to the dimensions shown in FIG. 10, dimension B is approximately one-half (0.5) of dimension A. Dimension C is approximately 0.4 of dimension A and approximately 0.8 of dimension B.

Dimension D is approximately 0.1 of dimension A, 0.2 of dimension B, and 0.25 of dimension C. Dimension E is preferably five times (5.0) that of dimension D. In at least one embodiment, the ratio of X' to Y' is 0.38. The aforementioned dimensions have been optimized to provide maximum fuel efficiency and thrust.

As will be apparent to those skilled in the art of fluid dynamics, the present invent ion is designed to take advantage of Bernoulli's principle, namely, that an increase in the velocity of a stream of fluid results in a decrease in pressure. This principle is applied in the context of the present disclosure at both dimension X' and dimension C. These are two places within the structure of the engine where fluids are compressed and then released into an area of greater volume, thereby creating a Venturi effect. Two vacuums are created in the engine disclosed herein—one where the toroidal combustion chamber 16 expels fluid into the throat area 9 and another where the intake 3 expels fluid into the throat area 9. The engine is designed so that both of these vacuums occur at the front end of the throat area and are aligned with each other laterally (see FIG. 6). Outside air is also partially drawn in according to the principles of the Bernoulli effect, which completes mixing of the non-combusted fuel passed to this area from the primary combustion chamber.

In operation, the propellant (fuel and oxidizer) is injected into the toroidal combustion chamber (i.e., the second circumferential gap 16), squeezed at dimension X', and then expelled from the toroidal combustion chamber at a relatively high velocity into the throat area 9, which functions as a secondary combustion chamber. The fluid is at its highest velocity (and lowest pressure) at this point, thereby creating a vacuum that draws ambient fluid in through the center of the intake 3 and into the throat area 9, where the ambient fluid mixes with a fuel-rich, high-speed combustion stream. The fluid temperature is at its highest inside the toroidal combustion chamber, where initial combustion takes place, and the flame from the toroidal combustion chamber 16 extends into the throat area 9 and through the center of the exhaust 12. The ambient air, which is at a relatively cooler temperature, enters through the intake 3 and mixes with the hot air in the throat area 9 to complete combustion of the fuel-enriched combustion stream from initial combustion.

Combustion occurs both in the toroidal combustion chamber (the second circumferential gap 16, which is the primary combustion chamber), where the fuel from the injector ports 4 is oxidized, and in the throat area 9 (the secondary combustion chamber) where the ambient air from the intake 3 mixes with the hot gasses from the toroidal combustion chamber. It is in the secondary combustion chamber that the ambient fluid is used as reaction mass. If the ambient fluid contains oxidizer, it is then used to complete combustion; if it does not, it simply acts as free reaction mass. The secondary combustion chamber is denoted as Z' in FIG. 10. Because the engine uses ambient fluid as reaction mass, a rocket vehicle equipped with the engine introduced herein would be required to carry less oxidizer than a conventional rocket vehicle. Put simply, a conventional rocket vehicle carries all of the required fuel and oxidizer, whereas a conventional jet vehicle carries all of the required fuel and no oxidizer (it uses ambient air as the oxidizer). The engine introduced here is neither a conventional rocket engine nor a conventional jet engine, because the vehicle on which it is mounted carries both fuel and oxidizer but requires less oxidizer than a conventional rocket engine. It should be noted that wherever references are made herein to "ambient air," other fluid s may be substituted for the ambient air. The term "ambient fluid" includes, but is not limited to, ambient air.

It can be seen that the intake 3, the toroidal combustion chamber (circumferential gap 16, also called primary combustion chamber) and the throat area 9 (also called secondary combustion chamber), due to their shapes and relative sizes and positioning, collectively form a "thrust generation means" for generating thrust, by expulsion of reaction mass from the shell, without the use of any moving parts within the engine, by combusting the fuel and oxidizer received into the engine to create a pressure differential that causes ambient fluid to be drawn into the engine and used within the engine as at least one of: a) oxidizer for additional combustion, or b) reaction mass.

Although at least one embodiment of the engine has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:
1. An engine comprising:
  a shell;
  an intake comprising a central aperture situated within the shell and disposed about a longitudinal central axis of the engine, via which to draw ambient fluid into the engine;
  a primary combustion chamber, situated within the shell, in which to combust a mixture of fuel and oxidizer, wherein the primary combustion chamber is annular in shape and is disposed about the longitudinal central axis of the engine between the intake and the shell;
  a floor that forms a surface between, and that is contiguous with, an aftmost end of the intake and an aftmost end of the primary combustion chamber, wherein a perimeter of the intake at the aftmost end of the intake has a first dimension in a plane that is perpendicular to the longitudinal central axis of the engine, a perimeter of the floor at the aftmost end of the primary combustion chamber has a second dimension in said plane, and a ratio of the first dimension to the second dimension is approximately 0.25; and
  a secondary combustion chamber, situated within the shell and in fluid communication with the intake, in which to combust a mixture of ambient fluid received via the intake and uncombusted mass expelled from the primary combustion chamber;
  wherein the intake, the primary combustion chamber, and the secondary combustion chamber are collectively arranged so that, when the engine is in operation, ejection of mass from the primary combustion chamber into the secondary combustion chamber causes a pressure differential that causes ambient fluid to be drawn into the secondary combustion chamber via the intake.

2. An engine as recited in claim 1, wherein the shell, the intake, the primary combustion chamber and the secondary combustion chamber are all formed from a single piece of material.

3. An engine as recited in claim 1, wherein when the engine is in operation, the ambient fluid drawn into the secondary combustion chamber via the intake is used as reaction mass in the secondary combustion chamber.

4. An engine as recited in claim 3, wherein when the engine is in operation and the ambient fluid contains oxidizer, oxidizer in the ambient fluid drawn into the secondary combustion chamber via the intake is used for combustion in the secondary combustion chamber.

5. An engine as recited in claim 1, wherein the intake and the primary combustion chamber are situated within a front end of the engine relative to an intended direction of travel of the engine during operation of the engine on a vehicle.

6. An engine as recited in claim 5, wherein the primary combustion chamber comprises an annular gap defined about the longitudinal central axis between an inner surface of a front end of the shell and an outer surface of the intake.

7. An engine as recited in claim 1, wherein the secondary combustion chamber comprises a throat area defined by a portion of an interior surface of the shell.

8. An engine as recited in claim 1, wherein the intake is substantially conical in shape, and wherein a front opening of the intake, relative to an intended direction of travel of the engine during operation of the engine on a vehicle, is wider than a rear opening of the intake.

9. An engine as recited in claim 1, further comprising an oxidizer port and a fuel port, each in fluid communication with the primary combustion chamber, via which to introduce oxidizer and fuel, respectively, into the primary combustion chamber.

10. An engine as recited in claim 1, further comprising a plurality of oxidizer ports and a plurality of fuel ports, each in fluid communication with the primary combustion chamber, via which to introduce oxidizer and fuel, respectively, into the primary combustion chamber, wherein the plurality of oxidizer ports and the plurality of fuel ports are disposed circumferentially about the longitudinal central axis of the engine.

11. An engine as recited in claim 1, wherein the floor is a substantially flat surface.

12. An engine as recited in claim 11, wherein the intake converges toward the longitudinal central axis of the engine in an afterward direction of the engine.

13. An engine as recited in claim 1, wherein the floor comprises a bulbous surface.

14. An engine comprising:
a shell;
an intake comprising a central aperture situated within the shell and disposed about a longitudinal central axis of the engine, via which to draw ambient fluid into the engine, wherein an inner surface of the intake converges toward the longitudinal central axis of the engine in an afterward direction of the engine;
an annular primary combustion chamber, situated within the shell, in which to combust a mixture of fuel and oxidizer;
a floor that includes a substantially flat surface between, and that is contiguous with, an aftmost end of the intake and an aftmost end of the primary combustion chamber, wherein the substantially flat surface diverges from the longitudinal central axis in an afterward direction of the engine, and wherein the substantially flat surface is substantially perpendicular, in a plane that includes the longitudinal central axis of the engine, to an inner surface of the primary combustion chamber at a narrowest point of an exit region of the primary combustion chamber; and
a secondary combustion chamber, situated within the shell and in fluid communication with the intake, in which to combust a mixture of ambient fluid received via the intake and uncombusted mass expelled from the primary combustion chamber;
wherein the intake, the primary combustion chamber, and the secondary combustion chamber are collectively arranged so that, when the engine is in operation, ejection of mass from the primary combustion chamber into the secondary combustion chamber causes a pressure differential that causes ambient fluid to be drawn into the secondary combustion chamber via the intake.

15. An engine as recited in claim 14, wherein a perimeter of the intake at the aftmost end of the intake has a first dimension in a plane that is perpendicular to the longitudinal central axis of the engine, a perimeter of the floor at the aftmost end of the primary combustion chamber has a second dimension in said plane, and a ratio of the first dimension to the second dimension is approximately 0.25.

16. An engine as recited in claim 14, wherein the annular primary combustion chamber is disposed about the longitudinal central axis of the engine between the intake and the shell, and wherein the intake is substantially conical in shape.

* * * * *